United States Patent [19]

Cho

[11] Patent Number: 6,144,333
[45] Date of Patent: Nov. 7, 2000

[54] METHOD FOR ESTIMATING GAIN AND PHASE IMBALANCE USING SELF-CALIBRATING MONOPULSE ANGLE DISCRIMINANTS IN A MONOPULSE RADAR SYSTEM

[75] Inventor: Kwang M. Cho, Rancho Palos Verdes, Calif.

[73] Assignee: Raytheon Company, Lexington, Mass.

[21] Appl. No.: 09/374,907

[22] Filed: Aug. 13, 1999

[51] Int. Cl.[7] ....................................................... G01S 13/44
[52] U.S. Cl. ........................................... 342/149; 342/160
[58] Field of Search .................................. 342/149, 152, 342/160, 161

[56] References Cited

U.S. PATENT DOCUMENTS 3,594,800  7/1971  Stoney ..................................... 342/159
3,794,998  2/1974  Pearson, Jr. et al. .................... 342/174

*Primary Examiner*—Ian J. Lobo
*Attorney, Agent, or Firm*—Leonard A. Alkov; Glenn H. Lenzen, Jr.

[57] ABSTRACT

A processing method or algorithm is for use with a monopulse radar system that provides accurate position information in a cross-range direction for ground moving targets detected using the monopulse radar system. The method corrects the phase of each detected moving target on an individual basis, and thus more accurately compensates for the phase error introduced into each target in a random fashion as a result of noise. The direction of angle correction is determined from clutter data. A gain correction factor includes a term for antenna effects to provide for a more accurate gain correction factor calculation.

6 Claims, 3 Drawing Sheets

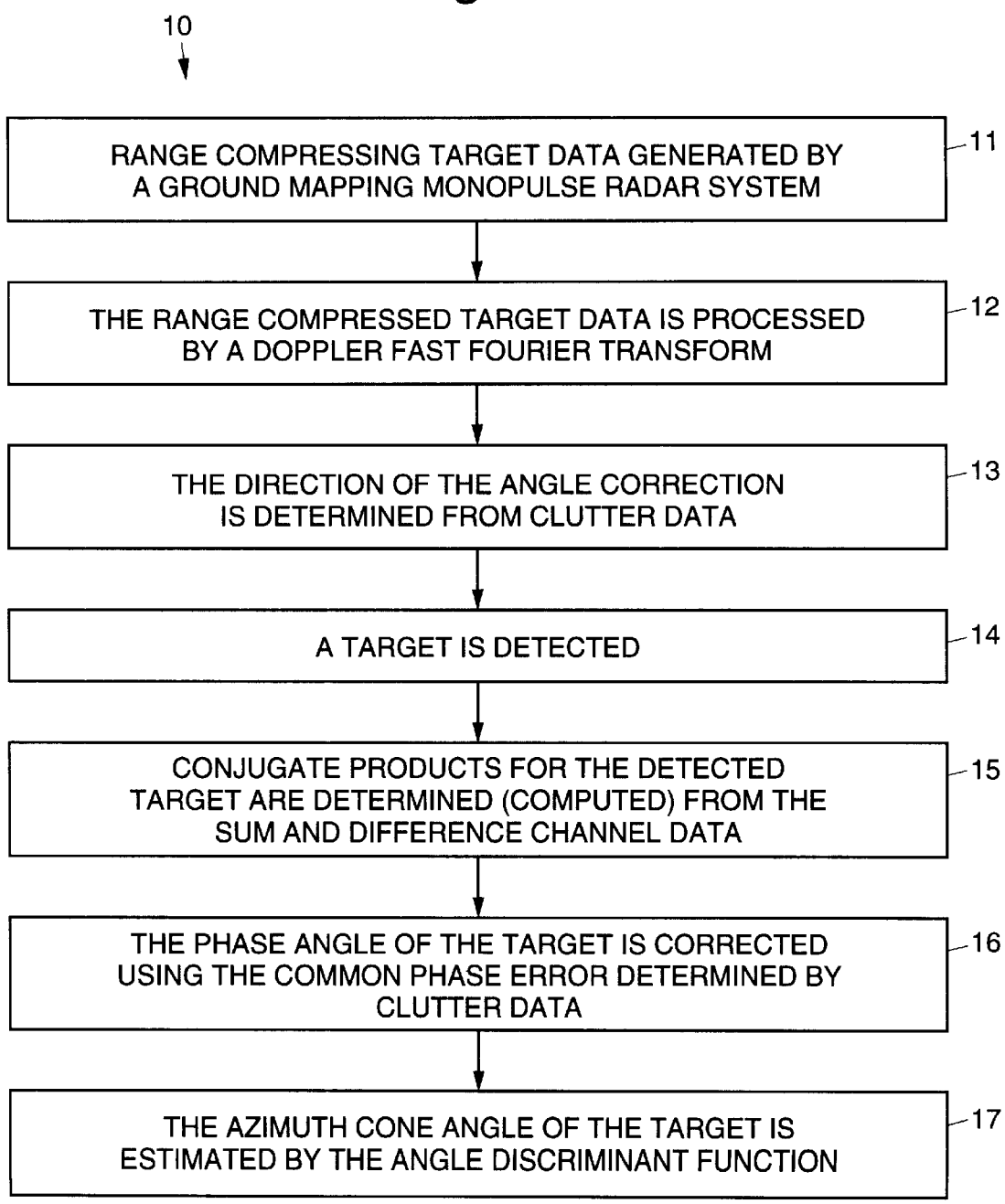

METHOD FOR ESTIMATING GAIN AND PHASE IMBALANCE USING SELF-CALIBRATING MONOPULSE ANGLE DISCRIMINANTS IN A MONOPULSE RADAR SYSTEM

BACKGROUND

The present invention relates generally to monopulse radar systems, and more specifically to a method or algorithm for improving the positional accuracy of ground moving targets for use with monopulse radar systems.

It is important to improve the positional accuracy of ground moving targets identified for reconnaissance systems, such as synthetic aperture radar systems manufactured by the assignee of the present invention. With the currently used method of monopulse calibration based on a table created in advance, a Enhanced Moving Target Indicator (EMTI) system developed by the assignee of the present invention shows generally poor results with regard to the positional accuracy of moving targets detected thereby. Also, monopulse calibration has been attempted based on discriminant slope using clutter returns. This technique showed improvements in some limited cases. However, its complexity in implementation and limitations in the performance improvement prevents its use in practice.

Accordingly, it is an objective of the present invention to provide for an improved method or algorithm that provides accurate position information in the cross-range direction for ground moving targets detected using a monopulse radar system.

SUMMARY OF THE INVENTION

Correction of gain and phase imbalance between sum and difference channels of a ground mapping monopulse radar system is a basic requirement in estimating the position of moving targets detected thereby. The present invention comprises a processing method or algorithm for use with a monopulse radar system that provides accurate position information in the cross-range direction for ground moving targets detected using the monopulse radar system. A reduced to practice embodiment of the present method demonstrated drastic improvements in the positional accuracy of displayed moving targets to produce superior results than those by any existing methods.

Unlike conventional approaches, the present method corrects the phase of each detected moving target on an individual basis, and thereby can more accurately compensate the phase error introduced into each target in a random fashion as a result of noise. Since the direction of angle correction is not available from the target range and Doppler bin, direction of angle correction is determined from clutter data. The gain correction factor used in the present method includes a term for antenna effects to provide for a more accurate gain correction factor calculation.

Implementing the present method is very simple since it does not involve offline testing to estimate the desired gain correction factor. The present method allows for dynamic correction of an imbalance factor from one array to the next. The simplicity of the implementation, its higher level of moving target positional accuracy, and the provision of dynamic correction are the main characteristics of the present method.

The present method provides accurate position information in the cross-range direction for ground moving targets detected by the monopulse radar system. The present invention provides for an algorithm that is implemented in the form of software used in the ground mapping monopulse radar system. The algorithm is not only simple to implement but effective to provide accurate position information in the cross-range direction for each detected moving target.

The method is characterized by a simple in implementation that corrects gain and phase error accurately, and is robust in erroneous conditions. Unlike prior art methods, the present method does not require that the gain/phase correction factor be computed in advance using an offline calibration test. The present method effectively compensates for the phase error due to noise by separately correcting the phase in each target. In general, the present algorithm is much less susceptive to unknown phase errors introduced in one channel than the prior art method which applies a constant phase error correction to all targets.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 is a flow diagram illustrating the present method or algorithm.

DETAILED DESCRIPTION

By way of introduction, a monopulse radar system determines position of a moving target using the time delay in a range direction and an angle offset ($\theta$) from boresight in a cross-range direction. In practice, the latter is much bigger than the former. The offset angle, $\theta$, which is often called the azimuth cone angle, is determined by a function known as a monopulse angle discriminant. The monopulse angle discriminant function for $\theta$ uses sum and difference channel data from the detected moving targets after Doppler filtering as follows.

$$\theta = (1/K)\mathrm{atan}((S\ D^*)/(S\ S^*)) \quad (1)$$

where K is a factor determined by subaperture separation and squint angle and S and D are the sum and difference channel data, respectively, and the asterisk indicates the conjugate of complex data.

If there is no imbalance between the sum and difference channel and/or if there is no noise effect, the argument of the atan function is real. With this assumption, therefore, the following formula is commonly used to estimate $\theta$.

$$\theta = (1/K)\mathrm{atan}(\mathrm{real}(S\ D^*)/(S\ S^*))$$

where real means taking the real part.

To get correct estimates of $\theta$, any gain and phase imbalance should be corrected prior to using data in this formula. One conventional technique for the estimation of gain/phase imbalance is to use a test signal and build a lookup table to compensate for errors with a specific hardware configuration used during data collection. This technique, however, does not work well if the gain and phase error varies dynamically from scene to scene.

Figure 1:
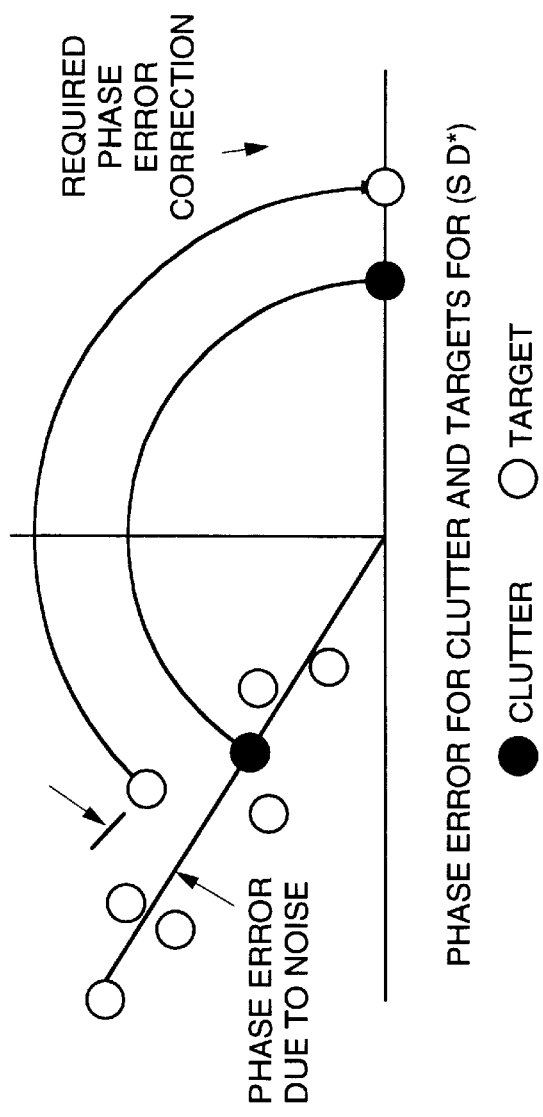
FIG. 1 illustrates the phase error for clutter and targets for sum and difference channels (S D*)

Referring now to the drawing figures, and in particular FIG. 1, phase error compensation will now be discussed. FIG. 1 illustrates the phase error for clutter and targets for the sum and difference channels (S D*) of the monopulse radar system.

The present method or algorithm does not require a separate test to determine the correction value for the gain and phase. The method or algorithm corrects error dynamically in each collected array. The method or algorithm performs well due to its ability to compensate for noise effects compared with the uniform phase correction as shown in FIG. 1. The method 10 or algorithm 10 was developed based on a simple insight about the angle discriminant function.

As mentioned above, the (S D*) term in equation (1) should be real. With a phase imbalance factor introduced between the sum and difference channels, however, the (S D*) term becomes complex. There are two phase errors that may be considered. The main phase error is common to all Doppler output data. The other phase error is due to noise and varies from bin to bin in both range and Doppler.

These two different types of errors may be corrected in accordance with the principles of the present invention by eliminating the phase in (S D*) shown in FIG. 1. The corrected value of (S D*) is either on the positive real axis or negative real axis. Therefore, it is necessary to determine the direction of the angle correction. The direction of the angle correction may be determined from the clutter data using the principles of the present invention. In actual implementation, this is equivalent to determining the sign of the magnitude of (S D*) for each detected target.

Figure 2:
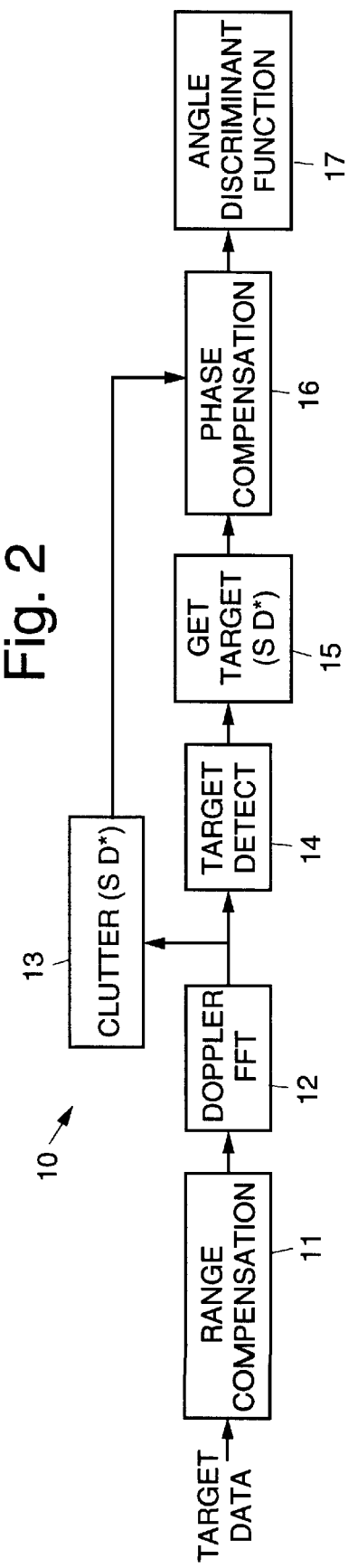
FIG. 2 illustrates a functional block diagram of a method or algorithm for computing phase angle compensation in accordance with the principles of the present invention.
Figure 3:
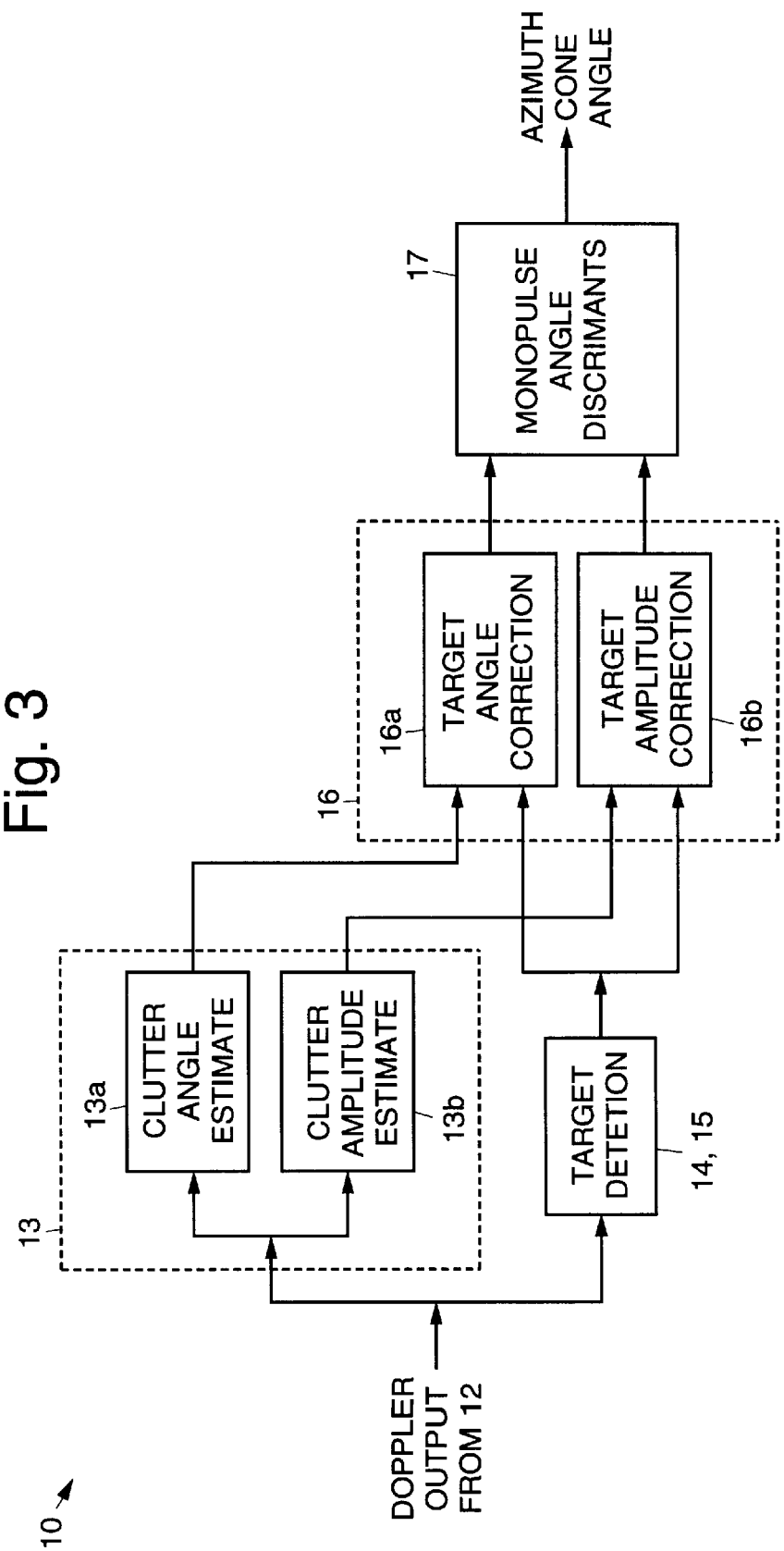
FIG. 3 illustrates angle estimation of moving targets in accordance with the principles of the present invention after range compression and Doppler filtering.

Given the above, an exemplary embodiment of the present invention is illustrated in FIG. 2. FIG. 2 illustrates a functional block diagram of an exemplary method 10 or algorithm 10 in accordance with the principles of the present invention for computing phase angle compensation. FIG. 3 illustrates details of the method 10 or algorithm 10 for computing phase angle compensation showing both gain and phase correction.

With reference to FIGS. 2 and 3, presented below are the detailed steps of the method 10 for implementing phase correction in accordance with the phase angle compensation method 10 of the present invention. Target data generated by a ground mapping monopulse radar system is range compressed 11 and processed by a Doppler fast Fourier transform (FFT) 12.

The direction of the angle correction is then determined 13 from clutter data. This is accomplished as follows. After Doppler FFT processing 12, a parameter, SDDcr, which is a delta conjugate product using clutter data, for clutter Doppler filters spanning −Ncl through (Ncl−1) is determined 13. SDDcr is given by $$SDDcr(r,d)=Sc(r,d) \times Dc(r,d)^* \text{ for } d=(-Ncl):(Ncl-1)$$

where Sc(r,d) is the sum channel data for clutter, Dc(r,d) is the difference channel data for clutter, r and d represent the range bin and Doppler filter, respectively, and Ncl is the number of Doppler filters for clutter in each channel. Then, the sum of SDDc(r,d) in range for SDDc(d) is determined using the equation:

$$SDDc(d) = \sum_r SDDcr(r, d) = Ac(d)\exp(j\Delta\theta c(d)).$$

Then, the weighted mean of the phase of the clutter after Doppler FFT processing 12 is determined using the equation:

$$\Delta\theta c = \left\{\sum_d \Delta\theta c(d)[Ac(d)]\right\} \bigg/ \left\{\sum_d Ac(d)^2\right\}.$$

The output of the this step is an estimate of the phase error between the sum and difference channel data, which corresponds to the direction of the angle correction.

The target is detected 14. St(r,d) and Dt(r,d) are denoted as the sum and difference channel data, respectively, of the moving targets that are detected 14 after Doppler FFT processing 12.

The conjugate products for the detected target are determined 15 from the sum and difference channel data using the equations:

$$SDDt(r,d)=St(r,d) \times Dt(r,d)^*=At(r,d)\exp(j\Delta\theta t(r,d)), \text{ and}$$

$$SDS(r,d)=St(r,d) \times St(r,d)^*=Bt(r,d).$$

This produces an estimate of the phase error of the target. The sum and difference channel data and the estimate of the phase error of the target are then processed to provide phase angle compensation 16.

The phase angle of the target is corrected 16 using a phase angle compensation algorithm using the target and clutter data as follows. For a target detected at range bin r and Doppler filter d, the corrected value for SDD is determined using the following algorithm.

Del=|Δθt(r,d)−Δθc|
if Del<=90 degrees,
   SDD(r,d)=At(r,d)
else
   SDD(r,d)=−At(r,d)
end A parameter DS(r,d) is calculated using the equation:

$$DS(r,d)=SDD(r,d)/SDS(r,d).$$

The azimuth cone angle (θ), or angle discriminant function, of a target detected at range bin r and Doppler bin d is then estimated 17 using the equation:

$$\theta(r,d)=(1/K)\text{atan}((DS(r,d)).$$

Thus, the present method 10 provides improved positional information in a cross-range direction for ground moving targets detected using a monopulse radar system. Using the present method 10, the gain and phase imbalance is corrected using self calibrating monopulse angle discriminants. The phase of each moving target detected by the monopulse radar system is corrected on an individual basis to compensate the phase error introduced into each target in a random fashion as a result of noise.

Amplitude error compensation will now be discussed. Dropping irrelevant terms, the amplitude imbalance between the sum and difference channels may be modeled by includ ing a gain imbalance factor (G) in the difference channel as follows.

$$S(\theta)=Ga(\theta)\cos(\pi L\theta \cos(\theta sq)/\lambda), \text{ and}$$

$$D(\theta)=Ga(\theta)\sin(\pi L\theta \cos(\theta sq)/\lambda)G.$$

In these equations, Ga is the antenna gain pattern, L is the distance between the two antenna subapertures, θsq is the squint angle, and λ is the radar wavelength. The antenna gain pattern (Ga) includes two gain patterns, one for transmission by a full antenna aperture and the other for reception by the antenna subaperture. The gain imbalance factor G may be obtained by taking the ratio of integrated power using the equation:

$$G=G_c G_d$$

where the data-dependent gain (Gd) is given by $$G_d = \sqrt{\sum |D(\theta)|^2 / \sum |S(\theta)|^2} = \sqrt{\frac{\sum [G_a(\theta)\cos(\pi L\theta \cos\theta_{sq}/\lambda)]^2}{\sum [G_a(\theta)\sin(\pi L\theta \cos\theta_{sq}/\lambda)]^2}}.$$

The data-dependent gain (Gd) is calculated from the collected data and the fixed gain (Gc) may be calculated when the antenna pattern is known. Defining lower and upper bounds for the summation as −θmax and θmax, θmax is properly set as $$\theta max=\Theta bw/\cos(\theta sq),$$

where Θbw is the antenna beamwidth at broadside. The corresponding Doppler filter number is then $$Nmax=(2v \cos(\theta sq)\theta max/\lambda)\times(NFFTaz/PRF)$$

$$=(2v\Theta bw/K)\times(NFFTaz/PRF).$$

Using the identity, Θbw=kλ/(2L), with k slightly greater than unity in general, the fixed gain (Gc) may be calculated from the equation:

$$G_c = \sqrt{\frac{\sum [G_a(\theta)\cos(\pi k\theta \cos\theta_{sq}/2\Theta_{bw})]^2}{\sum [G_a(\theta)\cos(\pi k\theta \cos\theta_{sq}/2\Theta_{bw})]^2}}$$

The fixed gain (Gc) is a function of squint angle and may be calculated offline and stored in the form of a lookup table. The difference channel gain (Gd) is obtained by taking the ratio of difference and sum channel power and its integration limit is 3 dB beamwidth at the actual squint angle. The compensating gain multiplier for the difference channel is G=1/(Gc×Gd).

For the purposes of completeness, FIG. 4 illustrates the present method 10 or algorithm 10 in flow diagram form. The method 10 is used with a monopulse radar system and provides accurate position information in a cross-range direction for ground moving targets detected using the monopulse radar system. The present method 10 comprises the following steps.

Target data generated by a ground mapping monopulse radar system is range compressed 11. The range compressed target data is processed by a Doppler fast Fourier transform (FFT) 12. The direction of the angle correction is determined 13 from clutter data. A target is detected 14. Conjugate products for the detected target are computed 15 from the sum and difference channel data. The phase angle of the target is determined 16 by processing the target and clutter data using a phase angle compensation algorithm. The azimuth cone angle (θ) of the target is estimated 17 using (or by) the angle discriminant function, which is the output of the present method 10.

Thus, an improved method or algorithm has been disclosed that provides accurate position information in a cross-range direction for ground moving targets detected using a monopulse radar system. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A method for use with a monopulse radar system that provides position information in a cross-range direction for ground moving targets detected using the monopulse radar system, comprising the steps of:

range compressing target data generated by a ground mapping monopulse radar system;

processing the range compressed target data using a Doppler fast Fourier transform;

determining the direction of angle correction from clutter data;

detecting a target;

determining conjugate products for the detected target from the sum and difference channel data;

determining the phase angle of the target by processing the target and clutter data; and estimating the azimuth cone angle of the target by the angle discriminant function.

2. The method recited in claim 1 wherein the step of determining the phase angle of the target comprises processing the target and clutter data using a phase angle compensation algorithm.

3. The method recited in claim 2 wherein the phase angle compensation algorithm comprises, for a target detected at range bin r and Doppler filter d:

Del=|Δθt(r,d)−Δθc|

If Del<=90 degrees,

SDD(r,d)=At(r,d)

else

SDD(r,d)=−At(r,d)

End where θ is an angle offset from boresight in a cross-range direction, SDD(r,d) is a conjugate product for the detected target derived from the difference channel data.

4. The method recited in claim 1 wherein the azimuth cone angle (θ) of a target detected at range bin r and Doppler bin d is estimated using a parameter DS(r,d) in accordance with the equation:

$$\theta(r,d)=(1/K)\operatorname{atan}((DS(r,d));$$

where DS(r,d)=SDD(r,d)/SDS(r,d), and where SDD(r,d) and SDS(r,d) are conjugate products for the detected target derived from the difference and sum channel data, respectively.

5. The method recited in claim 1 wherein the direction of angle correction is determined from clutter data by:

computing SDDcr, a delta conjugate product using clutter data, for clutter Doppler filters spanning −Ncl through (Ncl−1), where SDDcr is given by the equation:

$$SDDcr(r,d) = Sc(r,d) \times Dc(r,d)^*, \text{ for } d=(-Ncl):(Ncl-1),$$

where Sc(r,d) is the sum channel data for clutter, Dc(r,d) is the difference channel data for clutter, r and d represent the range bin and Doppler filter, respectively, and Ncl is the number of Doppler filters for clutter in each channel.

computing the sum of SDDc(r,d) in range for SDDc(d) is determined using the equation:

$$SDDc(d) = \sum_r SDDcr(r,d) = Ac(d)\exp(j\Delta\theta c(d));$$

and computing a weighted mean of the phase of the clutter using the equation:

$$\Delta\theta c = \left\{\sum_d \Delta\theta c(d)[Ac(d)]\right\} \bigg/ \left\{\sum_d Ac(d)^2\right\}$$

to provide an estimate of the phase error between the sum and difference channel data, which corresponds to the direction of the angle correction.

6. The method recited in claim 1 wherein the conjugate products for the detected target, SDDt(r,d) and SDS(r,d), are determined from the sum and difference channel data St(r,d) and Dt(r,d), respectively, using the equations:

$$SDDt(r,d) = St(r,d) \times Dt(r,d)^* = At(r,d)\exp(j\Delta\theta t(r,d)), \text{ and}$$

$$SDS(r,d) = St(r,d) \times St(r,d)^* = Bt(r,d),$$

to produce an estimate of the phase error of the target.

\* \* \* \* \*